Aug. 30, 1949.  C. A. RACKEY ET AL  2,480,607
AUDIENCE REACTION INTEGRATOR
Filed Jan. 18, 1947
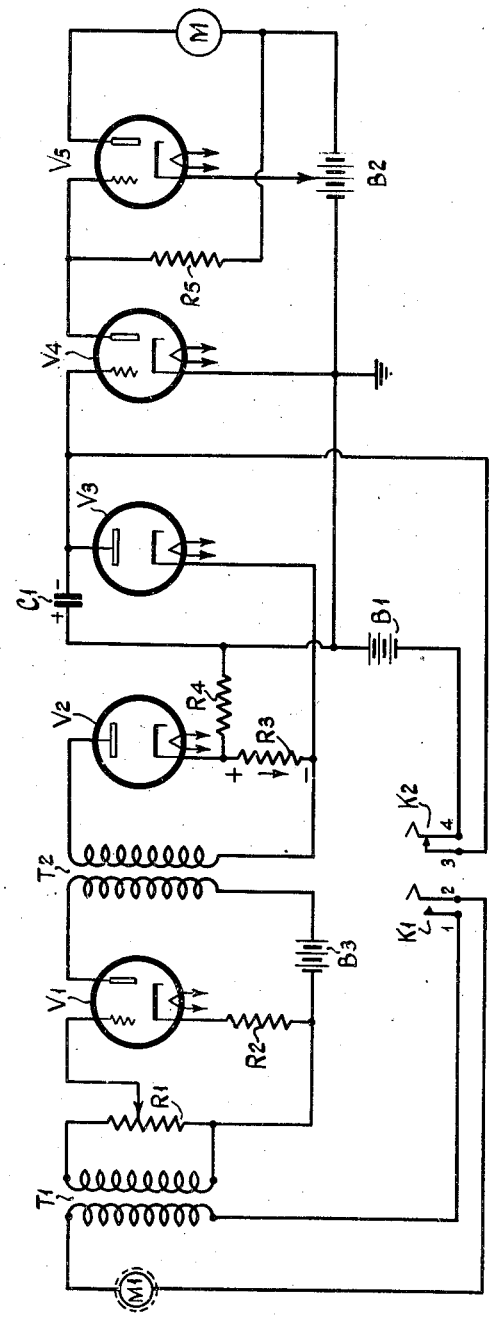
INVENTORS
CHESTER A. RACKEY.
and THOMAS H. PHELAN.
BY
H. S. Grover
ATTORNEY Patented Aug. 30, 1949

2,480,607

UNITED STATES PATENT OFFICE 2,480,607

AUDIENCE REACTION INTEGRATOR

Chester A. Rackey, Crestwood, N. Y., and Thomas H. Phelan, Maywood, N. J., assignors to Radio Corporation of America, a corporation of Delaware Application January 18, 1947, Serial No. 722,832

2 Claims. (Cl. 177—311)

This invention relates to an instantaneous reading power totalizer.

The primary object of our invention is to provide a sound power totalizing means to record applause from a broadcast studio audience, which applause record is proportional to the total sound level in the studo and to its time duration. Our invention is obviously applicable to other uses wherein a record or indication of peak values and duration of electrical energy representing sound or noise is to be made.

Heretofore, in the art, it has been general practice to measure audience reaction by means of a microphone, an audio frequency amplifier and a more or less standard volume or level indicator, such as a voltmeter. The indication of such a meter is roughly proportional to the instantaneous sound level received by the microphone. However, the scale of the meter is limited due to the fact that it registers logarithmically and tends to crowd varying reactions. In our audience reaction integrator, the meter has a linear scale and spreads out the readings.

Furthermore and of most importance, these known meters essentially read peaks or average only and do not take into account the duration of the sound level applause which is obviously an important element.

In other words, these known meters provide no indication of the extent to which the applause is sustained, at peak or other values.

Our invention of the present application is an improvement over known audience reaction indicators since it measures both the time duration of the sound level (applause) and its magnitude, and also provides for all practical purposes an unlimited scale for recording the total results.

In describing details of our invention, reference will be made to the attached drawings wherein the single figure illustrates by circuit element and connections, one embodiment of our audience reaction integrator.

In the drawings, M1 is a microphone connected to the primary winding of transformer T1 when the switch K1 is closed. This switch is closed when an audience reaction reading is to be taken and opened prior to taking a reading. The secondary winding of transformer T1 is shunted by a potentiometer R1. A point on the potentiometer R1 is coupled to the control grid of an electron discharge tube V1 in a somewhat conventional amplifier circuit including a cathode return resistor R2 which supplies the grid bias potential. The output electrodes of the tube V1 are coupled to the primary winding of a transformer T2. The secondary winding of the transformer T2 is coupled to the electrodes of a diode rectifier V2 which has as its load impedance the resistor R3 connected between the cathode of diode V2 and one end of the secondary winding of the transformer T2. The potential developed across the resistor R3, when rectification takes place, is fed to a storage condenser C1 including in its charge path, the impedance of a second diode V3 connecting one terminal of the condenser C1 to the negative end of resistor R3. As the sound magnitude increases, the current through the rectifier grows in proportion to the sound magnitude. The positive potential at R3 is applied to C1 so that in effect the grid end of C1 becomes more negative. The impedance of tube V3 in the reverse direction being high prevents discharge of the condenser C1 through the circuits described hereinbefore and the charge on C1 is proportional to the sound magnitude and duration. However, C1 is shunted by a switch K2 and a battery B1, the negative terminal of which is towards the right hand end of condenser C1 and the grid of tube V4 when the switch K2 is closed. The switch K2 is closed when the reaction meter is to be returned to zero setting to take another reading. The anode of tube V3 is connected to the control grid of a direct current amplifier tube V4, the anode of which is connected to the grid of tube V5. These tubes V4 and V5 are connected in what is known in the art as a directly coupled D. C. amplifier circuit and a meter M is included in the output circuit of tube V5 to indicate the current magnitude flowing in this tube. Individual plate potential sources B3 and B2 are shown for the sake of simplicity. Obviously, a common source may supply all of the potentials.

In operation, the switch K1 is closed and the microphone M1 picks up the audience applause and converts the same into electrical energy fed by transformer T1 to the control grid of tube V1. The amplified output of this tube is transferred by transformer T2 to the diode V2 rectifier circuit. Adjustment of the resistor R1 is used to supply the desired voltage to the rectifier V2 to set up across the load R3 the correct operating potential. The output of the transformer T2 is rectified by the diode V2 causing rectified current to flow through resistor R3. The potential developed across resistor R3 is supplied through resistor R4 and diode V3 to charge condenser C1. The rate of charge of the condenser C1 depends upon the values of the resistor R4 and condenser C1 and characteristics of tube V3. By using the diode V3 poled as shown, the condenser C1 is in a discharge path of such high impedance that C1 cannot be discharged when the switch K2 is open.

A more negative potential on the grid of vacuum tube V4 causes a decrease in the plate current through the resistor R5. This change in plate current through the resistor R5 due to the directly coupled amplifier connections makes less negative the grid potential of the tube V5 to increase the plate current reading registered in the meter M in the anode circuit of the tube V5. When the readings are taken K2 is open, permitting the potential at the anode of V3 to build up, in a negative direction, substantially proportionally to the amplitude of the applause which takes place in a predetermined time interval during which K1 is closed and K2 is open.

The zero setting of meter M is established by adjustment of the tap on battery B2 connected to the cathode circuit of V5. This adjustment is made for average audience reaction. Then the contacts 3, 4 on K2 are closed to supply a small D. C. potential from source B1 across the condenser C1. The value of this potential is then adjusted to a value at which zero reading position is again obtained on the meter M. The audience reaction meter is now ready for use. To take a reading, the contacts 3, 4 on K2 are opened and contacts 1, 2 on switch K1 are closed. The microphone M1 reacts to the magnitude of the sound to cause current to flow in transformer T1. Condenser C1 receives a charge which accumulates depending on the volume and sustained duration of the applause. The voltage produced by charging this condenser C1 is transferred through tubes V4 and V5 to meter M. At the end of a predetermined time period K1 is opened and the accumulative result of the applause is read on meter M. Then K2 is closed, applying a smaller negative potential to the grid of V4 to reduce the large negative potential thereon to return the meter M reading to zero. Closing the contacts of K2 also closes a discharge path for the condenser C1.

What is claimed is:

1. In an audience reaction integrator for indicating the magnitude of sound waves generated during a predetermined time interval, apparatus for generating alternating currents representing said sound waves, a rectifier in a circuit including a load impedance, a coupling between said first named apparatus and said rectifier for applying said alternating currents representing said sound waves to said rectifier, a capacitor in a charging path including said load impedance, a one-way valve in said charging path which prevents discharge of said condenser through said path, a meter whose readings are proportional to the charge on said condenser, a switch operable at will for disabling said alternating current generating apparatus, and means operable at will for providing a discharge path for said condenser.

2. In apparatus for measuring and comparing audience reaction by producing indications of the magnitude of sound waves caused by the audience during a predetermined time interval, an amplifier having an input and an output, a rectifier in a circuit including a load impedance coupled to the amplifier output, a capacitor in a charging path including said load impedance, a one-way valve in said charging path which prevents discharge of said capacitor, an amplifier connected to said capacitor to be excited by the charge thereof, a meter in the output circuit of said amplifier, a microphone in a circuit coupled to the input of said first amplifier, a switch in said microphone circuit which is closed when a measurement is to be made, and a discharge path for said capacitor including a second switch which is open during the time of measurement and closed to discharge said capacitor before making a new measurement.

CHESTER A. RACKEY.
THOMAS H. PHELAN.

REFERENCES CITED

The following references are of record in the file of this patent:

UNITED STATES PATENTS

| Number | Name | Date |
|---|---|---|
| 2,050,852 | Moore | Aug. 11, 1936 |
| 2,149,558 | Stansbury | Mar. 7, 1939 |
| 2,162,239 | Beuermann | June 13, 1939 |
| 2,300,198 | Brown | Oct. 27, 1942 |
| 2,389,991 | Mayle | Nov. 27, 1945 |
| 2,405,133 | Brown | Aug. 6, 1945 |